(12) United States Patent
Wei

(10) Patent No.: US 10,302,955 B2
(45) Date of Patent: May 28, 2019

(54) THREE-DIMENSIONAL DISPLAY SYSTEM HAVING THREE-DIMENSIONAL GRATING

(71) Applicant: BOE TECHNOLOGY GROUP CO., LTD., Beijing (CN)

(72) Inventor: Wei Wei, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 14/437,140

(22) PCT Filed: Oct. 11, 2014

(86) PCT No.: PCT/CN2014/088380
§ 371 (c)(1),
(2) Date: Apr. 20, 2015

(87) PCT Pub. No.: WO2015/158119
PCT Pub. Date: Oct. 22, 2015

(65) Prior Publication Data
US 2016/0124233 A1    May 5, 2016

(30) Foreign Application Priority Data

Apr. 15, 2014  (CN) .......................... 2014 1 0150914

(51) Int. Cl.
*G02B 27/22*     (2018.01)
*G02B 27/26*     (2006.01)
(Continued)

(52) U.S. Cl.
CPC ......... *G02B 27/22* (2013.01); *G02B 27/2214* (2013.01); *G02B 27/4205* (2013.01);
(Continued)

(58) Field of Classification Search
CPC combination set(s) only.
See application file for complete search history.

(56) References Cited

U.S. PATENT DOCUMENTS

2003/0067460 A1* 4/2003 Tomono ............. G02B 27/2214
                                                        345/419
2004/0246423 A1* 12/2004 Sasabayashi ..... G02F 1/133707
                                                        349/130
(Continued)

FOREIGN PATENT DOCUMENTS

CN      101329463 A    12/2008
CN      201917718 U     8/2011
(Continued)

OTHER PUBLICATIONS

Sep. 21, 2015—(CN)—First Office Action Appn 201410150914.6 with Eng Tran.
(Continued)

*Primary Examiner* — Lauren Nguyen
(74) *Attorney, Agent, or Firm* — Banner & Witcoff, Ltd.

(57) ABSTRACT

A three-dimensional display system is provided, comprising: a display device; a three-dimensional grating, located on a light emitting side of the display device; and a refractive index adjusting device, disposed between the display device and the three-dimensional grating, wherein the refractive index adjusting device adjusts a viewing distance of the three-dimensional display system by changing a refractive index of outgoing light emitted from the display device to the three-dimensional grating. The viewing distance of the three-dimensional display system is changeable, so that the three-dimensional display system has enhanced space adaptability and a wider application range.

11 Claims, 4 Drawing Sheets

(51) Int. Cl.
*G02B 27/42* (2006.01)
*G02F 1/1337* (2006.01)
*H04N 13/315* (2018.01)
*H04N 13/373* (2018.01)

(52) U.S. Cl.
CPC ..... *G02F 1/133753* (2013.01); *H04N 13/315* (2018.05); *H04N 13/373* (2018.05); *G02B 27/26* (2013.01); *G02F 1/133784* (2013.01); *G02F 2001/133757* (2013.01); *G02F 2201/30* (2013.01)

(56) References Cited

U.S. PATENT DOCUMENTS

| | | | | |
|---|---|---|---|---|
| 2008/0316380 | A1* | 12/2008 | Ijzerman | G02B 27/2214 349/15 |
| 2010/0073465 | A1 | 3/2010 | Park et al. | |
| 2012/0008056 | A1* | 1/2012 | Gong | G02B 27/2214 349/15 |
| 2013/0242235 | A1* | 9/2013 | Wei | G02B 5/18 349/96 |
| 2013/0265509 | A1* | 10/2013 | Choi | G02F 1/1347 349/15 |

FOREIGN PATENT DOCUMENTS

| | | |
|---|---|---|
| CN | 102540494 A | 7/2012 |
| CN | 102955302 A | 3/2013 |
| CN | 103442240 A | 12/2013 |
| CN | 103576408 A | 2/2014 |
| CN | 103955067 A | 7/2014 |
| CN | 203786410 U | 8/2014 |
| JP | 772445 A | 3/1995 |
| TW | 201312994 A | 3/2013 |

OTHER PUBLICATIONS

Dec. 30, 2015—(CN)—Second Office Action Appn 201410150914.6 with English Tran.
Jan. 23, 2015—(WO) Internatinal Search Report and Written Opinion PCT/CN2014/088380 with Eng Tran.

* cited by examiner

THREE-DIMENSIONAL DISPLAY SYSTEM HAVING THREE-DIMENSIONAL GRATING

The application is a U.S. National Phase Entry of International Application No. PCT/CN2014/088380 filed on Oct. 11, 2014, designating the United States of America and claiming priority to Chinese Patent Application No. 201410150914.6 filed on Apr. 15, 2014. The present application claims priority to and the benefit of the above-identified applications and the above-identified applications are incorporated by reference herein in their entirety.

TECHNICAL FIELD

Embodiments of the present invention relate to a three-dimensional display system.

BACKGROUND

Currently, a three-dimensional (3D) display technology has been a matter of great concern. In order to implement 3D display, a frequently-used 3D technology is to dispose a three-dimensional grating on a light emitting side of a display panel. The three-dimensional grating may be divided into an active grating and a passive grating, wherein, the active grating includes a liquid crystal slit grating, a liquid crystal lens grating and the like, and the passive grating includes a cylindrical lens grating and a slit grating, etc.

As shown in FIG. 1, it is illustrated with a case where a slit grating 101 is disposed on the light emitting side of the display panel as an example, light emitted from different sub-pixel units 102 (FIG. 1 is illustrated by taking 5 sub-pixel units as an example) in the display panel are projected into different viewing fields, and two eyes 103 of a viewer are respectively positioned within the different viewing fields, so a 3D sense can be produced. As shown in FIG. 1, a is a distance between the sub-pixel units 102 on the display panel and the slit grating 101, and b is a viewing distance of the 3D display device, i.e., a distance between the sub-pixel units 102 in the display panel and the eyes 103 of the viewer.

In a current 3D display technology, the distance a between the slit grating and the display panel is fixed, so the viewing distance b of the display panel viewed by the viewer is also fixed. When the viewer views the display panel at a distance other than the viewing range b, a problem of crosstalk may occur, affecting a 3D display effect.

SUMMARY OF THE INVENTION

Embodiments of the present invention provide a three-dimensional display system whose viewing distance is changeable, so that 3D display is not limited to a fixed viewing distance.

In one aspect, an embodiment of the present invention provides a three-dimensional display system, comprising: a display device; a three-dimensional grating, located on a light emitting side of the display device; and a refractive index adjusting device, disposed between the display device and the three-dimensional grating, wherein the refractive index adjusting device adjusts a viewing distance of the three-dimensional display system by changing a refractive index of outgoing light emitted from the display device to the three-dimensional grating.

BRIEF DESCRIPTION OF THE DRAWINGS

In order to clearly illustrate the technical solution of the embodiments of the invention, the drawings of the embodiments will be briefly described in the following; it is obvious that the described drawings are only related to some embodiments of the invention and thus are not limitative of the invention.

DESCRIPTION OF THE EMBODIMENTS

In order to make objects, technical details and advantages of the embodiments of the invention apparent, the technical solutions of the embodiment will be described in a clearly and fully understandable way in connection with the drawings related to the embodiments of the invention. It is obvious that the described embodiments are just a part but not all of the embodiments of the invention. Based on the described embodiments herein, those skilled in the art can obtain other embodiment(s), without any inventive work, which should be within the scope of the invention.

Hereinafter, a three-dimensional display system provided by an embodiment of the present invention will be described in detail in conjunction with accompanying drawings.

Figure 1:
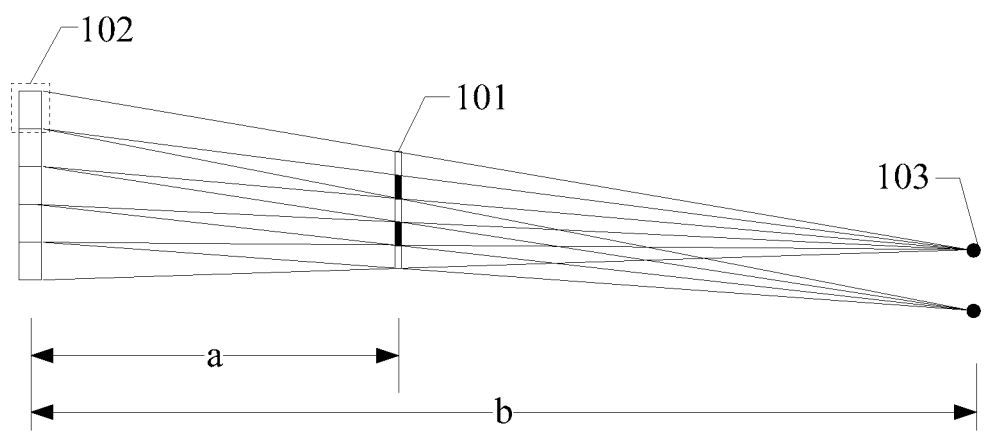
FIG. 1 is a light path schematic view of a three-dimensional display system in the prior art.
Figure 2A:
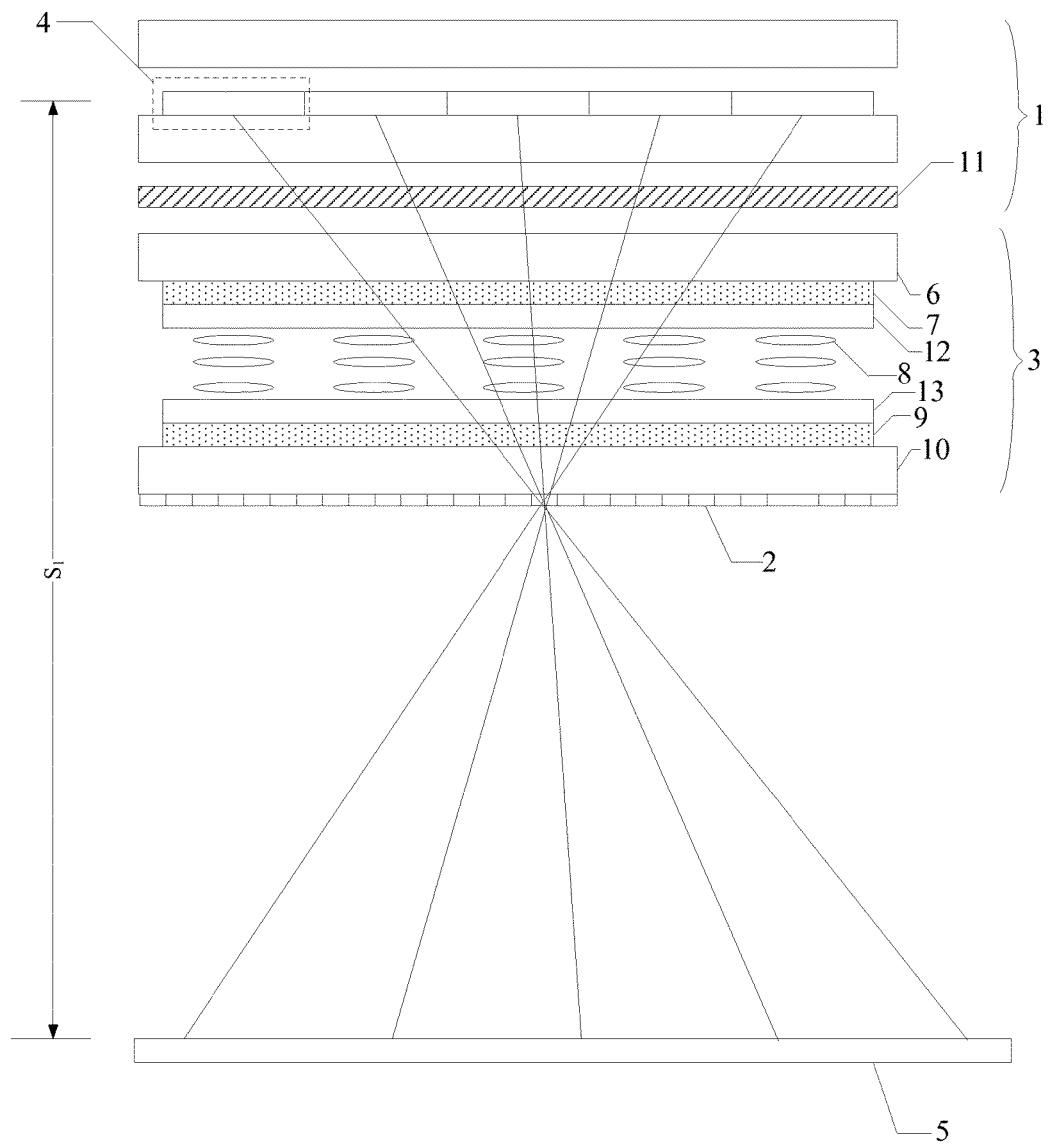
FIG. 2a and FIG. 2b are respectively light path schematic views of a three-dimensional display system provided by an embodiment of the present invention before and after a viewing distance is adjusted.
Figure 2B:
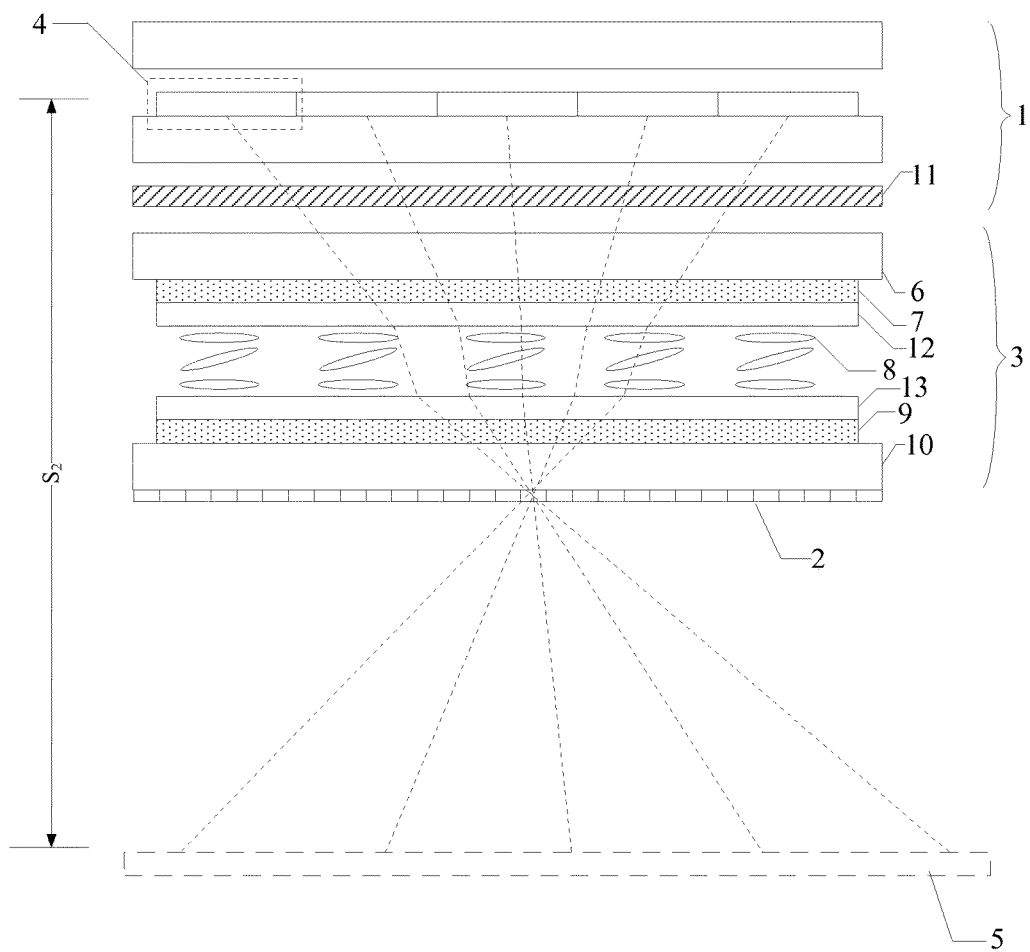

The three-dimensional display system provided by the embodiment of the present invention, as shown in FIG. 2a and FIG. 2b, comprises: a display device 1; a three-dimensional grating 2 located on a light emitting side of the display device 1; and a refractive index adjusting device 3, disposed between the display device 1 and the three-dimensional grating 2, wherein the refractive index adjusting device 3 adjusts a viewing distance of the three-dimensional display system by changing a refractive index of outgoing light emitted from the display device 1 to the three-dimensional grating 2.

The above-described three-dimensional display system provided by the embodiment of the present invention, comprises the display device 1 and the three-dimensional grating 2 located on the light emitting side of the display device 1, since the refractive index adjusting device 3 is additionally disposed between the display device 1 and the three-dimensional grating 2, the refractive index adjusting device 3 can adjust the viewing distance of the three-dimensional display system by changing a refractive index of the outgoing light emitted from the display device 1 to the three-dimensional grating 2, so the viewing distance of the three-dimensional display system is changeable, thus allowing the three-dimensional display system to have enhanced space adaptability and a wider application range.

FIG. 2a and FIG. 2b are respectively light path views of the above-described three-dimensional display system provided by the embodiment of the present invention before and after the viewing distance is adjusted. As shown in FIG. 2a, the viewing distance of the three-dimensional display system, i.e., a distance between each of sub-pixel units 4 in the display device 1 and two eyes 5 of a viewer, is S1; as shown in FIG. 2b, the refractive index adjusting device 3 changes a travelling path of the outgoing light emitted from the display device 1 to the three-dimensional grating 2, by changing the refractive index of the outgoing light emitted from the display device 1 to the three-dimensional grating 2. After the outgoing light passes through the three-dimensional grating 2, the viewing distance of the three-dimensional display system, i.e., the distance between each of the sub-pixel units 4 in the display device 1 and the two eyes 5 of the viewer, becomes S2, and thus, after adjusted by the refractive index adjusting device 3, the viewing distance of the three-dimensional display system is changed.

Figure 2C:
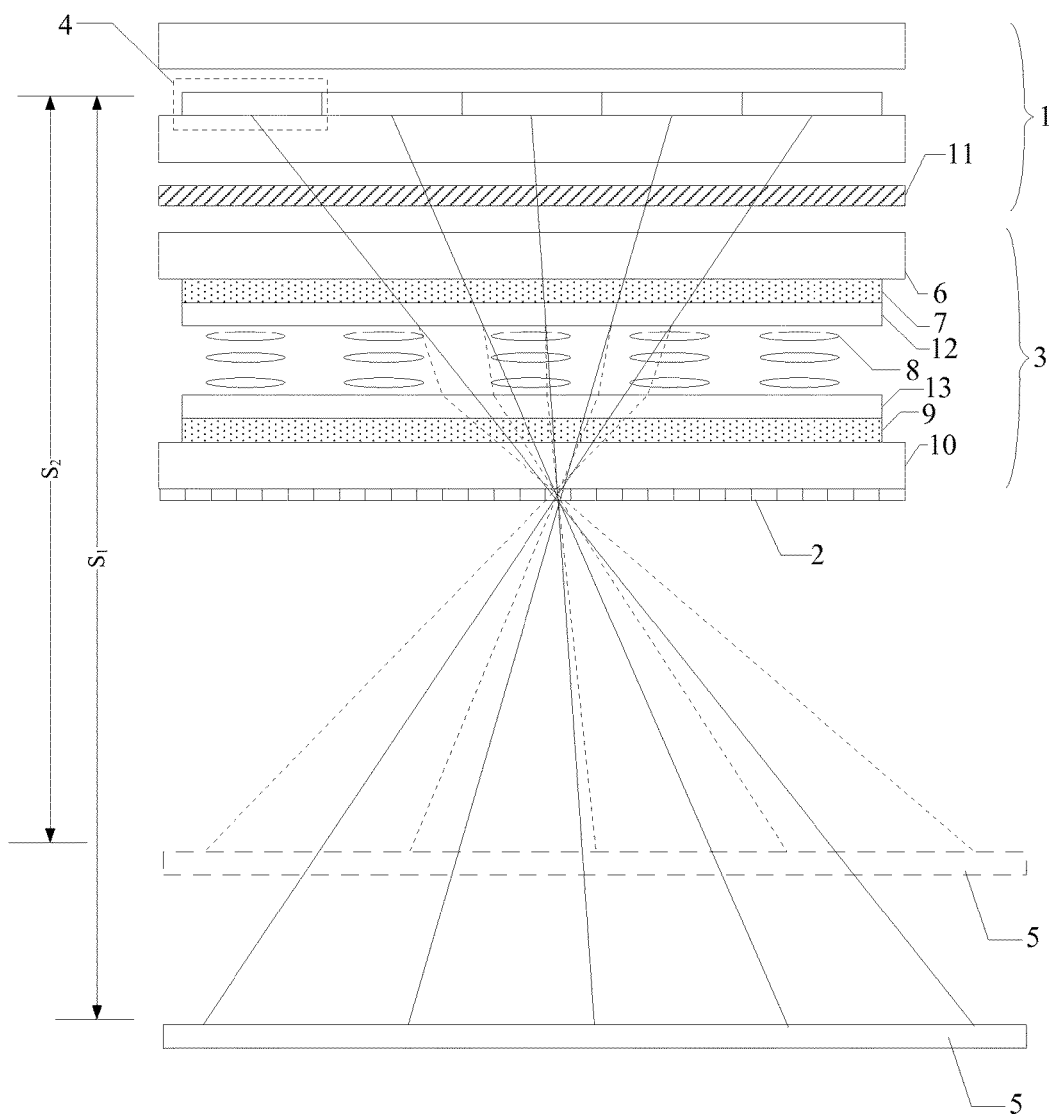
FIG. 2c is a comparison view of FIG. 2a and FIG. 2b.

In order to facilitate observing change of the viewing distance of the three-dimensional display system, the light path views shown in FIG. 2*a* and FIG. 2*b* are incorporated as a light path view shown in FIG. 2*c*, and it can be seen from FIG. 2*c* that, the viewing distance of the three-dimensional display system is reduced after adjusted by the refractive index adjusting device 3.

Exemplarily, for the above-described three-dimensional display system provided by the embodiment of the present invention, as shown in FIG. 2*a* and FIG. 2*b*, the refractive index adjusting device 3 changes the refractive index of the outgoing light emitted from the display device 1 to the three-dimensional grating 2, for example, the refractive index adjusting device 3, along a direction from the display device 1 to the three-dimensional grating 2, may include: a first substrate 6, a first electrode 7, a liquid crystal layer 8, a second electrode 9 and a second substrate 10 disposed sequentially, wherein, the first electrode 7 and the second electrode 9 may be provided on an entire surface; liquid crystal molecules in the liquid crystal layer 8 will rotate, when a voltage signal is applied to the first electrode 7 and the second electrode 9, so the refractive index of the outgoing light passing through the liquid crystal layer 8 is changed, thus enabling the viewing distance of the three-dimensional display system to be changed.

Exemplarily, the refractive index of the outgoing light passing through the liquid crystal layer 8 may be changed to different degrees, by applying different voltage signals to the first electrode 7 and the second electrode 9, so as to the adjustment of the viewing distance of the three-dimensional display system can be achieved, so the viewing distance of the three-dimensional display system is changeable, thus allowing the three-dimensional display system to have enhanced space adaptability and a wider application range.

Exemplarily, a voltage value of the voltage signal applied to the first electrode 7 and the second electrode 9 is generally controlled within a range of 0V-5V.

In addition, the greater a difference between a refractive index of the liquid crystal molecules in the liquid crystal layer 8 in the refractive index adjusting device 3 along a direction of a long axis and a refractive index along a direction of a short axis, the wider an adjustable range of the viewing distance of the three-dimensional display system; and the greater a distance between the first substrate 6 and the second substrate 10, the wider the adjustable range of the viewing distance of the three-dimensional display system.

In the above-described three-dimensional display system provided by the embodiment of the present invention, as shown in FIG. 2*a* and FIG. 2*b*, the display device 1 is provided with a polarizer 11 on a side of the refractive index adjusting device 3; the refractive index adjusting device 3 may further include: a first alignment layer 12 located on a side facing the liquid crystal layer 8 of the first electrode 7. Because if a rubbing direction of the first alignment layer 12 and a polarization direction of the polarizer 11 are perpendicular to each other, the voltage signal applied to the first electrode 7 and the second electrode 9 makes the liquid crystal molecules rotate, the outgoing light passing through the polarizer 11 always travels along the direction of the short axis of the liquid crystal molecules and the refractive index of the outgoing light emitted from the display device 1 to the three-dimensional grating 2 remains unchanged, so as not to adjust the viewing distance of the three-dimensional display system; accordingly, an included angle between the rubbing direction of the first alignment layer 12 and the polarization direction of the polarizer 11 is set to be greater than or equal to 0° and less than 90°.

Exemplarily, in order to increase the adjustable range of the refractive index of the outgoing light emitted from the display device 1 to the three-dimensional grating 2, the rubbing direction of the first alignment layer 12 and the polarization direction of the polarizer 11 may be set to be parallel to each other. The outgoing light passing through the polarizer 11 is transmitted along the direction of the long axis of the liquid crystal molecule, when a zero voltage signal or no voltage signal is applied to the first electrode 7 and the second electrode 9; the outgoing light passing through the polarizer 11 travels along the direction of the short axis of the liquid crystal molecule, when a voltage signal greater than zero is applied to the first electrode 7 and the second electrode 9 so that the liquid crystal molecule rotates; and thus, the refractive index of the outgoing light emitted from the display device 1 to the three-dimensional grating 2 is changed, so the adjustment of the viewing distance of the three-dimensional display system can be achieved.

Exemplarily, for the above-described three-dimensional display system provided by the embodiment of the present invention, the refractive index adjusting device 3 may further include a second alignment layer 13 located on a side facing the liquid crystal layer 8 of the second electrode 9. A rubbing direction of the second alignment layer 13 may be any direction, the second alignment layer 13 with the rubbing direction being any direction can make the refractive index of the outgoing light emitted from the display device 1 to the three-dimensional grating 2 to be changed, so the adjustment of the viewing distance of the three-dimensional display system can be achieved, which will not be limited here.

Exemplarily, in order to further increase the adjustable range of the refractive index of the outgoing light emitted from the display device 1 to the three-dimensional grating 2, in the above-described three-dimensional display system provided by the embodiment of the present invention, the rubbing direction of the second alignment layer 13 and the rubbing direction of the first alignment layer 12 may be perpendicular to each other, or, the rubbing direction of the second alignment layer 13 and the rubbing direction of the first alignment layer 12 may also be parallel to each other, which will not be limited here.

Exemplarily, under a condition that the rubbing direction of the second alignment layer 13 and the rubbing direction of the first alignment layer 12 are perpendicular to each other or parallel to each other, the outgoing light passing through the polarizer 11 is transmitted along the direction of the long axis of the liquid crystal molecule, when zero voltage signal is applied to the first electrode 7 and the second electrode 9; and the outgoing light passing through the polarizer 11 is transmitted along the direction of the short axis of the liquid crystal molecule, when the voltage signal greater than zero is applied to the first electrode 7 and the second electrode 9 so that the liquid crystal molecule rotates, thus, the refractive index of the outgoing light emitted from the display device 1 to the three-dimensional grating 2 is changed, the adjustment of the viewing distance of the three-dimensional display system can be achieved.

Exemplarily, in the above-described three-dimensional display system provided by the embodiment of the present invention, the refractive index adjusting device 3 and the three-dimensional grating 2 may share the second substrate 10 as a base substrate, thus, one base substrate can be saved, the production cost of the three-dimensional display system is reduced, and further an overall thickness of the three-dimensional display system is reduced.

Exemplarily, for the above-described three-dimensional display system provided by the embodiment of the present invention, the three-dimensional grating 2 may be an active grating, or a passive grating, which will not be limited here. Herein, the active grating may include a liquid crystal slit grating and a liquid crystal lens grating, etc., and the passive grating may include a cylindrical lens grating and a slit grating, etc. In addition, structures of the active grating and the passive grating may be the structures known to the inventor, which will not be repeated here.

For the above-described three-dimensional display system provided by the embodiment of the present invention, illustration is always provided with the three-dimensional grating 2 being the slit grating as an example, but the liquid crystal slit grating, the liquid crystal lens grating or the cylindrical lens grating may also be used as the three-dimensional grating 2, and the embodiment in which the slit grating is used as the three-dimensional grating 2 may be referred to, which will not be repeated here.

Exemplarily, for the above-described three-dimensional display system provided by the embodiment of the present invention, the display device 1 may be a liquid crystal display device, or may be an organic electroluminescence display device, which will not be limited here. Further, structures of the liquid crystal display device and the organic electroluminescence display device may the structures known to the inventor, which will not be repeated here. In addition, the liquid crystal display device may be Advanced-Super Dimensional Switching (ADS) type, Twisted Nematic (TN) type or Fringe Field Switching (FFS) type liquid crystal display device, which will not be limited here.

In the above-described three-dimensional display system provided by the embodiment of the present invention, when the display device 1 is the liquid crystal display device, a light emitting side of the liquid crystal display device may be an array substrate side, i.e., the three-dimensional grating 2 may be disposed on the array substrate side; or, the light emitting side of the liquid crystal display device may also be an opposed substrates side, i.e., the three-dimensional grating 2 may be disposed on the opposed substrate side, which will not be limited here.

When the display device 1 in the above-described three-dimensional display system provided by the embodiment of the present invention is the organic electroluminescence display device, a light emitting side of the organic electroluminescence display device may be the array substrate side, i.e., the three-dimensional grating 2 may be disposed on the array substrate side; or the light emitting side of the organic electroluminescence display device may be a side of a cover glass opposed to the array substrate, i.e., the three-dimensional grating 2 may be disposed on the cover glass side, which will not be limited here.

The three-dimensional display system provided by the embodiment of the present invention, comprises: the display device and the three-dimensional grating located on the light emitting side of the display device; since the refractive index adjusting device is additionally disposed between the display device and the three-dimensional grating, the refractive index adjusting device adjusts the viewing distance of the three-dimensional display system by adjusting the refractive index of the outgoing light emitted from the display device to the three-dimensional grating, so the viewing distance of the three-dimensional display system is changeable, and the three-dimensional display system is no longer limited to a fixed viewing distance, and thus has enhanced space adaptability and a wider application range.

The embodiment of the invention being thus described, it will be obvious that the same may be varied in many ways. Such variations are not to be regarded as a departure from the spirit and scope of the invention, and all such modifications as would be obvious to those skilled in the art are intended to be included within the scope of the following claims.

The present application claims priority of Chinese Patent Application No. 201410150914.6 filed on Apr. 15, 2014, the disclosure of which is incorporated herein by reference in its entirety as part of the present application.

What is claimed is:

1. A three-dimensional display system, comprising:
a display device having a polarizer, the display device being configured to emit light passing through the polarizer;
a refractive index adjusting device, disposed
on a light emitting side of the display device and configured to receive the light passing through the polarizer and reduce a viewing distance of the three-dimensional display system by changing a refractive index of the light,
the refractive index adjusting device comprising: a first substrate, a first electrode, a liquid crystal layer, a second electrode, and a second substrate disposed sequentially; and
a slit grating, disposed on a light exiting side of the refractive index adjusting device and located on a side of the second electrode opposite to the liquid crystal layer
the slit grating is in contact with the second substrate, and no gap is formed between the slit grating and the refractive index adjusting device.

2. The three-dimensional display system according to claim 1, wherein under a condition that a voltage signal is applied to the first electrode and the second electrode, liquid crystal molecules in the liquid crystal layer rotate, so that a refractive index of light passing through the liquid crystal layer is changed.

3. The three-dimensional display system according to claim 1, wherein the refractive index adjusting device further comprises: a first alignment layer located on a side of the first electrode facing the liquid crystal layer, wherein an included angle between a rubbing direction of the first alignment layer and a polarization direction of the polarizer is greater than or equal to 0° and less than 90°.

4. The three-dimensional display system according to claim 3, wherein the rubbing direction of the first alignment layer and the polarization direction of the polarizer are parallel to each other.

5. The three-dimensional display system according to claim 3, wherein the refractive index adjusting device further comprises: a second alignment layer located on a side of the second electrode facing the liquid crystal layer.

6. The three-dimensional display system according to claim 5, wherein a rubbing direction of the second alignment layer and the rubbing direction of the first alignment layer are perpendicular to each other or parallel to each other.

7. The three-dimensional display system according to claim 1, wherein the slit grating is an active grating or a passive grating.

8. The three-dimensional display system according to claim 1, wherein the display device is a liquid crystal display device or an organic electroluminescence display device.

9. The three-dimensional display system according to claim 2, wherein the voltage signal is within a range of 0V-5V.

10. The three-dimensional display system according to claim 1, wherein the display device further comprises sub-pixel units, and wherein the viewing distance is a distance between each of the sub-pixel units and two eyes of a viewer.

11. The three-dimensional display system according to claim 1, wherein a light having a changed refractive index exits from the second substrate and then passes through the slit grating.

* * * * *